United States Patent
Sanji et al.

(10) Patent No.: US 8,265,126 B2
(45) Date of Patent: Sep. 11, 2012

(54) RECEIVING DEVICE FOR SPREAD SPECTRUM COMMUNICATION

(75) Inventors: Kenichiro Sanji, Okazaki (JP); Akira Takaoka, Okazaki (JP); Hiromichi Naitoh, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 873 days.

(21) Appl. No.: 12/379,321

(22) Filed: Feb. 19, 2009

(65) Prior Publication Data
US 2009/0207892 A1 Aug. 20, 2009

(30) Foreign Application Priority Data
Feb. 20, 2008 (JP) .................................. 2008-39369

(51) Int. Cl.
*H04B 1/00* (2006.01)
(52) U.S. Cl. ........ 375/150; 375/316; 375/147; 375/140; 375/152; 375/130
(58) Field of Classification Search .................. 375/150, 375/316, 147, 140, 152, 130
See application file for complete search history.

(56) References Cited

U.S. PATENT DOCUMENTS

| | | | |
|---|---|---|---|
| 5,832,029 A | 11/1998 | Mimura | |
| 2001/0012316 A1* | 8/2001 | Maruyama | 375/148 |
| 2002/0141485 A1* | 10/2002 | Mimura | 375/147 |
| 2003/0002566 A1* | 1/2003 | McDonough et al. | 375/147 |
| 2003/0189971 A1 | 10/2003 | Jin | |
| 2004/0258131 A1* | 12/2004 | Margon | 375/130 |
| 2005/0168382 A1* | 8/2005 | Awata | 342/357.02 |
| 2005/0180489 A1 | 8/2005 | Tamaki | |
| 2006/0245480 A1* | 11/2006 | Medlock et al. | 375/150 |

FOREIGN PATENT DOCUMENTS

| | | |
|---|---|---|
| JP | A-H4-079438 | 3/1992 |
| JP | A-H5-122120 | 5/1993 |
| JP | A-H5-219011 | 8/1993 |
| JP | A-H6-104863 | 4/1994 |
| JP | A-H8-237170 | 9/1996 |
| JP | A-H11-331032 | 11/1999 |

* cited by examiner

*Primary Examiner* — Siu Lee
(74) *Attorney, Agent, or Firm* — Posz Law Group, PLC

(57) ABSTRACT

A receiving device for spread spectrum communication includes a phase determining unit and a data demodulating unit. The receiving device receives a signal spread and modulated with first spreading code. The phase determining unit calculates a cross correlation between the received signal and a second spreading code and determines a phase P(0) of the received signal based on the cross correlation. The data demodulating unit synchronizes the phase P(0) and the first spreading code and despreads and demodulates the received signal with the first spreading code. The number of components in each of the first spreading code and the second spreading code is an integer greater than or equal to 2.

5 Claims, 9 Drawing Sheets

FIG. 3

| | | | |
|---|---|---|---|
| | | SPREADING CODE | |
| PHASE SHIFTING AMOUNT | 0 | RECEIVED SIGNAL / RECEIVED SIGNAL × SPREADING CODE | |
| | 1 | RECEIVED SIGNAL / RECEIVED SIGNAL × SPREADING CODE | |
| | 2 | RECEIVED SIGNAL / SPREADING CODE × RECEIVED SIGNAL | |
| | ⋮ | ⋮ | ⋮ |
| | (y−2) | RECEIVED SIGNAL / RECEIVED SIGNAL × SPREADING CODE | |
| | (y−1) | RECEIVED SIGNAL / RECEIVED SIGNAL × SPREADING CODE | |

FIG. 5A

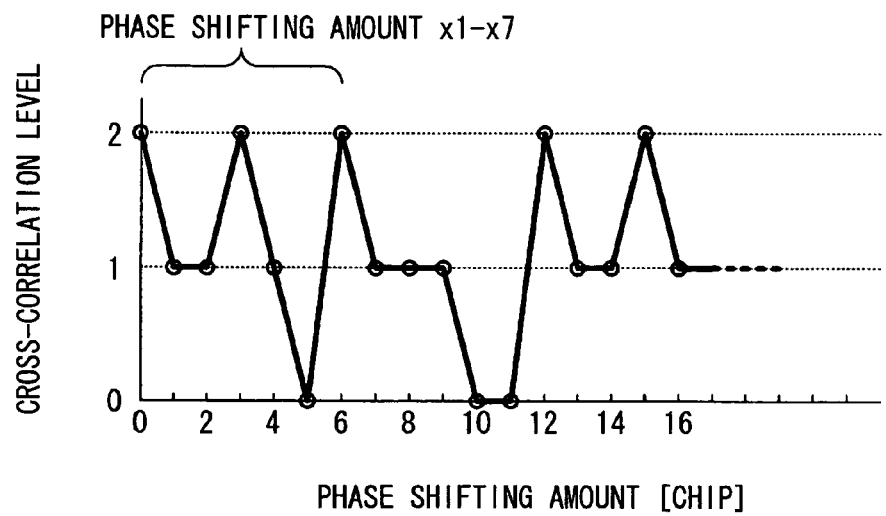

FIG. 5B

| PHASE SHIFTING AMOUNT [CHIP] | CROSS-CORRELATION LEVEL | FEATURE VALUE |
|---|---|---|
| 0 | 2, 1, 1, 2, 1, 0, 2 | $2 \times 3^6 + 1 \times 3^5 + 1 \times 3^4 + 2 \times 3^3 + 1 \times 3^2 + 0 \times 3^1 + 2$ |
| 1 | 1, 1, 2, 1, 0, 2, 1 | $1 \times 3^6 + 1 \times 3^5 + 2 \times 3^4 + 1 \times 3^3 + 0 \times 3^2 + 2 \times 3^1 + 1$ |
| 2 | 1, 2, 1, 0, 2, 1, 1 | $1 \times 3^6 + 2 \times 3^5 + 1 \times 3^4 + 0 \times 3^3 + 2 \times 3^2 + 1 \times 3^1 + 1$ |
| 3 | 2, 1, 0, 2, 1, 1, 1 | $2 \times 3^6 + 1 \times 3^5 + 0 \times 3^4 + 2 \times 3^3 + 1 \times 3^2 + 1 \times 3^1 + 1$ |
| ⋮ | ⋮ | ⋮ |
| 125 | 0, 0, 2, 1, 1, 2, 1 | $0 \times 3^6 + 0 \times 3^5 + 2 \times 3^4 + 1 \times 3^3 + 1 \times 3^2 + 2 \times 3^1 + 1$ |
| 126 | 0, 2, 1, 1, 2, 1, 0 | $0 \times 3^6 + 2 \times 3^5 + 1 \times 3^4 + 1 \times 3^3 + 2 \times 3^2 + 1 \times 3^1 + 0$ |

RECEIVING DEVICE FOR SPREAD SPECTRUM COMMUNICATION

CROSS REFERENCE TO RELATED APPLICATIONS

The present application is based on and claims priority to Japanese Patent Application No. 2008-39369 filed on Feb. 20, 2008, the contents of which are incorporated in their entirety herein by reference.

BACKGROUND OF THE INVENTION

1. Field of the Invention

The present invention relates to a receiving device for a spread spectrum communication.

2. Description of the Related Art

In a spread spectrum communication, a transmitting device spreads and modulates an original signal with a spreading code and transmits the modulated signal. A receiving device despreads and demodulates a received signal with the spreading code. When the receiving device despreads the received signal, the receiving device acquires synchronization of the received signal and the spreading code.

For acquiring synchronization of the spreading code, a sliding correlator can be used, for example. When the sliding correlator is used, a process for determining a synchronizing point of the received signal and the spreading code is repeated at each time when the receiving device receives a signal of one phase. Thus, it may take a long time to acquire synchronization and a response of a communication system may be reduced.

Alternatively, a matched filter can be used for acquiring synchronization. In such a case, a synchronizing point of the received signal and the spreading code is concurrently determined for the received signals of a plurality of phases. Thus, the time required for acquiring synchronization can be reduced compared with a case where the sliding correlator is used. A configuration of the matched filter corresponds to a configuration of a plurality of sliding correlators arranged in parallel. Thus, a circuit size increases in a case where the received signal is despread in an analog process, and the number of gates increases in a case where the received signal is despread in a digital process. Thus, a cost, the circuit size, and a consumption current increase. The time required for acquiring synchronization can be reduced by concurrently executing a process for auto correlating the received signal with the spreading code. However, the number of the process for the autocorrelation is not much different from a case where the sliding correlator is used.

A sliding correlator disclosed in JP-A-5-219011 counts the number of matching and mismatching of the received signal and the spreading code. The sliding correlator counts only until the receiving device acquires synchronization at a threshold level. Thereby, the number of processes can be reduced and the time for acquiring synchronization can be reduced. In the method described in JP-A-5-219011, a transmitting device transmits only a fixed-value data until the receiving device completes the acquisition. The transmitting device needs to be informed that the synchronization acquisition is completed. Thus, it takes time from when the synchronization acquisition is completed till when the receiving device receives an actual data.

In a communication system disclosed in JP-A-8-23710, a transmitting device inserts a non-spread preamble between bits of a spread transmitting signal. A receiving device detects a synchronizing point based on the non-spread preamble. In such a case, a communication time increases due to the non-spread preamble. Thus, a transmitting rate is reduced for the preamble when ordinary data is transmitted and received after the acquiring synchronization.

SUMMARY OF THE INVENTION

In view of the foregoing problems, it is an object of the present invention to provide a receiving device for a spread spectrum communication that can acquire synchronization at a high speed.

A receiving device according an aspect of the present invention includes a phase determining unit and a data demodulating unit. The receiving device receives a signal spread and modulated with a first spreading code. The phase determining unit calculates a cross correlation between the received signal and a second spreading code and determines a phase P(0) of the received signal based on the cross correlation. The phase P(0) is a synchronizing point with the first spreading code. The data demodulating unit synchronizes the phase P(0) and the first spreading code and despreads and demodulates the received signal with the first spreading code. The number of components in each of the first spreading code and the second spreading code is defined as an integer greater than or equal to 2.

BRIEF DESCRIPTION OF THE DRAWINGS

Additional objects and advantages of the present invention will be more readily apparent from the following detailed description of preferred embodiments when taken together with the accompanying drawings. In the drawings:

FIG. 3 is a diagram illustrating a relationship between a phase shifting amount and waveforms of a received signal and a demodulated signal;

FIG. 5A is a graph illustrating the relationship between the phase shifting amount and the cross-correlation value between the received signal and the phase-determination spreading code;

FIG. 5B is a diagram illustrating the relationship between the phase shifting amount and the corresponding combination of cross-correlation values;

DETAILED DESCRIPTION OF THE PREFERRED EMBODIMENTS

Figure 1:
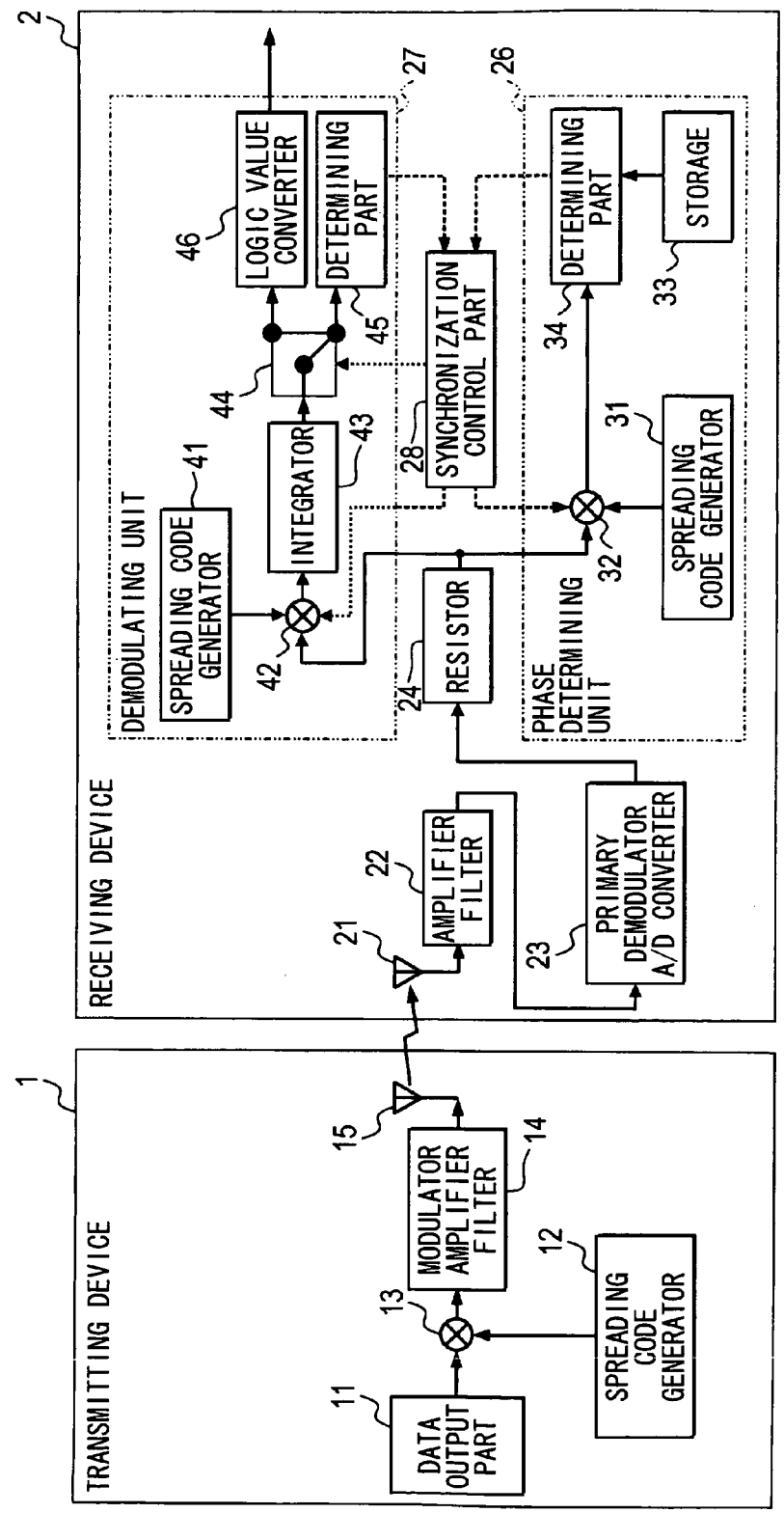
FIG. 1 is a block diagram illustrating a remote keyless entry system including a transmitting device and a receiving device according to a first embodiment.

In a spread spectrum communication system, a transmitting device spreads and modulates a signal and transmits the modulated signal. A receiving device according to an aspect of the present invention receives the signal from the transmitting device. The receiving device includes a phase determining unit and a data demodulating unit. The phase determining unit calculates a cross correlation between the received signal and a second spreading code and determines a phase P(0) of the received signal based on the cross correlation. The phase P(0) is a synchronizing point with the first spreading code. The data demodulating unit synchronizes the phase P(0) and the first spreading code and despreads and demodulates the received signal with the first spreading code.

In the present application, a phase P(k) means a phase shifted by k chips from the synchronizing point with the first spreading code. For example, a phase P(1) means a phase shifted by 1 chip from the synchronizing point. A phase $P(x_1)$ means a phase shifted by $x_1$ chip from the synchronizing point. Thus, the phase P(0) means a phase shifted by 0 chips from the synchronizing point. That is, the phase P(0) is a phase being the synchronizing point with the first spreading code.

The first spreading code can be a code used in a general spread spectrum communication. The transmitting device and the receiving device use the same spreading code as the first spreading code.

Any code can be used as the first spreading code as long as the transmitting device and the receiving device use the same code. For example, a M-sequence code or a Gold code can be used as the first spreading code.

In a case where a transmitting signal is spread and modulated with the first spreading code, a synchronization acquisition between the received signal and the first spreading code is required for despreading and demodulating the received signal. In a general spread spectrum communication, a correlation value between the received signal and the first spreading code is detected using a sliding correlator or a matched filter.

A correlation value between the received signal and the first spreading code has a high value only at the phase P(0) being the synchronizing point. At other phases shifted from the synchronizing point, the correlation value uniformly has a low value regardless of a phase shifting amount.

Thus, when the synchronizing point is determined based on the correlation value between the received signal and the first spreading code, the correlation value is detected the same number of times as the number of chips of one cycle of the first spreading code while shifting the phase by one chip. Then, a point having the highest correlation value is found and the point is determined as the synchronizing point.

The second spreading code is different from the first spreading code. The second spreading code is used at the receiving device only for acquiring synchronization. Thus, any code being convenient for acquiring synchronization can be used as the second spreading code. For example, the second spreading code can be selected so that a cross-correlation value between the received signal and the second spreading code changes in accordance with the shifting amount when the cross-correlation value is detected while shifting the phase with respect to the received signal.

When a relationship between the cross-correlation correlation value and the phase shifting amount is previously calculated, the phase shifting amount can be determined based on the detected cross-correlation value.

Thus, unlike a case where the correlation value between the received signal and the first spreading code is detected, the cross-correlation value is not required to be detected the same number of times as the number of chips of one cycle of the spreading code until the point having the highest correlation value is detected. Thus, a time required for detecting the correlation values can be reduced and the synchronization acquisition can be performed at a high speed.

In a case where the number of components included in each of the first spreading code and the second spreading code is defined as Y, there are Y different shifting amounts. That is, the phase shifting amounts become 0, 1, . . . , (Y−1) chips, respectively. If the second spreading code can be selected so that the cross-correlation values corresponding to the respective phase shifting amounts have unique values different from each other, the phase shifting amount can be specified as one of 0, 1, . . . , (Y−1) chips by detecting only one cross-correlation value.

Depending on the selected second spreading code, the cross-correlation values corresponding to the respective phase shifting amounts may not have unique values. For example, the cross-correlation value at the phase shifting amount s1 may be the same as the cross-correlation value at the phase shifting amount s2. In such a case, the phase shifting amount is difficult to be specified as one of 0, 1, . . . , (Y−1) by detecting only one cross-correlation value.

The phase determining unit may include a cross-correlation calculating element. The cross correlation calculating element selects a combination of N phases from the received signal. The combination of N phases is defined as $\{P(x_1), P(x_2), \ldots, P(x_N)\}$, in which $x_1, x_2, \ldots, x_N$ represent phase shifting amounts from the phase P(0) and each of the phase shifting amounts is not specified before the phase P(0) is determined. A phase shifting difference between two of the phase shifting amounts is a predetermined number of chips. The cross-correlation calculating element calculates a product sum of the received signal for Y chips included in each of the N phases $\{P(x_1), P(x_2), \ldots, P(x_N)\}$ and the second spreading code so that a combination of N cross-correlation values defined as $\{Q(x_1), Q(x_2), \ldots, Q(x_N)\}$ corresponding to the combination of N phases $\{P(x_1), P(x_2), \ldots, P(x_N)\}$ is obtained.

The combination of N cross-correlation values $\{Q(x_1), Q(x_2), \ldots, Q(x_N)\}$ provides a specific combination corresponding to the phase shifting amount $x_1$. Thus, the cross-correlation calculating element specifies the phase shifting amount $x_1$ based on the combination of N cross-correlation values $\{Q(x_1), Q(x_2), \ldots, Q(x_N)\}$. Then, the cross-correlation calculating element determines the phase P(0) as a phase shifted by the phase shifting amount $x_1$ from the phase $P(x_1)$.

That is, the receiving device determines the phase shifting amount $x_1$ based on the combination of N cross-correlation values $\{Q(x_1), Q(x_2), \ldots, Q(x_N)\}$ because the combination of N cross-correlation values $\{Q(x_1), Q(x_2), \ldots, Q(x_N)\}$ is unique to each of Y cases where the phase shifting amount $x_1$ is 0, 1, . . . , (Y−1).

Thus, even if some of the phase shifting amounts have the same value, the phase shifting amount $x_1$ can be determined based on the combination of N cross-correlation values $\{Q(x_1), Q(x_2), \ldots, Q(x_N)\}$. Thereby, it is not required for selecting the second spreading code so that the cross-correlation value has a different value when the phase shifting amount is different. As a result, the second spreading code can be easily selected.

The second spreading code can be selected so that the calculated cross-correlation values do not vary among many values. For example, the second spreading code can be selected so that the cross-correlation values vary among only several different values. When the variable number of the cross-correlation value is reduced, even if the cross-correlation value fluctuates due to an external cause such as noise, a misidentification of the cross-correlation value can be reduced. Thus, a resistance to noise can be increased.

When the variable number of the cross-correlation values is reduced, there is a possibility that one combination of the N cross-correlation values $\{Q(x_1), Q(x_2), \ldots, Q(x_N)\}$ is same as another combination. However, the possibility can be reduced by increasing N, that is, the number of cross-correlation values. When the number of N increases, the number of phases $\{P(x_1), P(x_2), \ldots, P(x_N)\}$ used for determining the synchronizing point increases. Thus, the variable number of the cross-correlation value may be set taking into consideration a balance between the number of N and the resistance to noise.

When the phase shifting amount $x_1$ is determined based on the combination of N cross-correlation values $\{Q(x_1), Q(x_2), \ldots, Q(x_N)\}$, the combination of N cross-correlation values $\{Q(x_1), Q(x_2), \ldots, Q(x_N)\}$ is converted into $x_1$ by any way.

For example, the phase determining unit may include a storage. A relationship between the phase shifting amount $x_1$ and the corresponding combination of N cross-correlation values $\{Q(x_1), Q(x_2), \ldots, Q(x_N)\}$ may be previously calculated for each of Y cases where the phase shifting amount $x_1$ is $0, 1, \ldots, (Y-1)$, and the storage may store the relationship as phase determining information.

When the cross-correlation calculating element in the phase determining unit calculates one combination of N cross-correlation values $\{Q(x_1), Q(x_2), \ldots, Q(x_N)\}$, the cross-correlation calculating element determines the phase shifting amount x1 corresponding to the calculated combination of N cross-correlation values $\{Q(x_1), Q(x_2), \ldots, Q(x_N)\}$ by reference to the phase determining information stored in the storage. Then, the cross-correlation calculating element determines the phase P(0) as a phase shifted by the phase shifting amount $x_1$ from the phase $P(x_1)$.

Thus, by searching the combination of N cross-correlation values $\{Q(x_1), Q(x_2), \ldots, Q(x_N)\}$ from the phase determining information previously stored in the storage, the phase shifting amount $x_1$ corresponding to the combination of N cross-correlation values $\{Q(x_1), Q(x_2), \ldots, Q(x_N)\}$ can be easily specified.

A relationship among the shifting amounts $x_1, x_2, \ldots, x_N$ is predetermined. For example, each of the phase shifting amounts $x_1, x_2, \ldots, x_N$ may be an integer satisfying an equation of $x_M = x_1 + M - 1$, in which M is one of $2, \ldots, N$. In such a case, the phase is shifted by one chip.

The second spreading code may by selected so that each of the N cross-correlation values $\{Q(x_1), Q(x_2), \ldots, Q(x_N)\}$ becomes one of 3 predetermined values. In such a case, the resistance to noise can be increased compared with a case where the variable number of the cross-correlation values is greater than 3, as described above.

The data demodulating unit may execute a process for determining the phase P(0) of the received signal based on an autocorrelation between the received signal and the first spreading code concurrently when the phase determining unit executes a process for determining the phase P(0) based on the cross correlation.

When one of the phase determining unit and the data demodulating unit determines the phase P(0), then the data demodulating unit synchronizes the determined phase P(0) and the first spreading code and despreads and demodulates the received signal with the first spreading code.

In such a case, even if the phase determining unit cannot determine the phase P(0) base on the cross correlation due to an external cause such as noise, the synchronization acquisition can be performed when the phase P(0) is determined base on the autocorrelation. Thus, in normal cases, the synchronization acquisition can be performed at a high speed by determining the phase P(0) based on the cross correlation. In a case where the phase P(0) cannot be determined based on the cross correlation, the synchronization acquisition can be performed by determining the phase P(0) based on the autocorrelation.

(First Embodiment)

A receiving device 2 according to a first embodiment of the present invention will now be described with reference to FIG. 1. The receiving device 2 can be used for a remote keyless entry system with a transmitting device 1. The transmitting device 1 can be carried by a user of a vehicle. The receiving device 2 is provided in the vehicle. The transmitting device 1 transmits data to the receiving device 2 by a spread spectrum communication.

The transmitting device includes a data output part 11, a spreading code generator 12, a computing element 13, a modulator/amplifier/filter 14, and an antenna 15. The data output part 11 outputs a transmitting signal to the computing element 13. The spreading code generator 12 outputs a modulation spreading code to the computing element 13. The modulation spreading code corresponds to the first spreading code in the above-described aspect. The computing element 13 spreads and modulates the transmitting signal by multiplying the transmitting signal by the modulation spreading code. The computing element 13 outputs the modulated signal to the antenna 15 through the modulator/amplifier/filter 14.

The receiving device 2 includes an antenna 21, an amplifier/filter 22, a primary demodulator/analog-digital converter 23, a resistor 24, a phase determining unit 26, a demodulating unit 27, and a synchronization control part 28.

A radio signal transmitted from the transmitting device 1 is received at the antenna 21. The antenna 21 outputs the received signal to the primary demodulator/analog-digital converter 23 through the amplifier/filter 22. The primary demodulator/analog-digital converter 23 converts the received signal into a digital signal and outputs the digital signal to the resistor 24. The resistor 24 stores the digital signal.

The resistor 24 operates as a first-in first-out (FIFO) system. The resistor 24 outputs signals to the phase determining unit 26 and the demodulating unit 27. The phase determining unit 26 and the demodulating unit 27 acquire synchronization individually.

The phase determining unit 26 includes a spreading code generator 31, a computing element 32, a storage 33, and a determining part 34. The resistor 24 outputs the signal to the computing element 32. The spreading code generator 31 outputs a phase-determination spreading code to the computing element 32. The phase-determination spreading code corresponds to the second spreading code in the above-described aspect. The computing element 32 multiplies the signal by the phase-determination spreading code.

The signal from the resistor 24 has been modulated by the modulation spreading code in the transmitting device 1. The phase-determination spreading code is different from the modulation spreading code. The computing element 32 calculates a cross-correlation between the signal from the resistor 24 and the phase-determination spreading code.

The computing element 32 outputs the calculated signal to the determining part 34. The determining part 34 determines a phase of the received signal with reference to phase-determining information stored in the storage 33. When the determining part 34 determines a synchronizing point of the received signal and the phase-determination spreading code, the determining part 34 transmits information about the synchronizing point to the synchronization control part 28.

The demodulating unit 27 includes a spreading code generator 41, a computing element 42, an integrator 43, a switch 44, a determining part 45, and a logic value converter 46. The resistor 24 outputs the signal to the computing element 42. The spreading code generator 41 outputs a demodulation spreading code to the computing element 42. The demodulation spreading code corresponds to the first spreading code in the above-described aspect. The computing element 42 multiplies the signal by the demodulation spreading code.

The demodulation spreading code output from the spreading code generator 41 is same as the modulation spreading code output from the spreading code generator 12 of the transmitting device 1. The signal from the resistor 24 has been modulated by the modulation spreading code in the transmitting device 1. The computing element 42 calculates an autocorrelation between the signal from the resistor 24 and the demodulation spreading code.

The computing element 42 outputs the calculated signal to the integrator 43. The integrator 43 integrates the signal and outputs the integrated signal to the determining part 45 through the switch 44. The determining part 45 determines a phase of the received signal by measuring the correlation for one cycle of the demodulation spread code. The method of determining the phase is similar to a method used in a sliding correlator and a matched filter. When the determining part 45 determines a synchronizing point of the received signal and the demodulation spread code, then the determining part 45 transmits information about the synchronizing point to the synchronization control part 28.

In the receiving device 2, the phase determining unit 26 and the demodulating unit 27 concurrently execute processes for acquiring synchronization. A synchronization acquisition method of phase determining unit 26 is different from a synchronization acquisition method of the demodulating unit 27. The phase determining unit 26 can acquire synchronization earlier than the demodulating unit 27 unless there is a special circumstance, for example, a case where the phase determining unit 26 fails to acquire synchronization due to interference of noise.

Thus, in normal cases, the information about the synchronizing point is transmitted from the phase determining unit 26 to the synchronization control part 28. Then, the synchronization control part 28 outputs a synchronizing signal for executing synchronization control. If the phase determining unit 26 fails to acquire synchronization, the information about the synchronizing point may be transmitted from the demodulating unit 27 to the synchronization control part 28. Also in such a case, the synchronization control part 28 outputs the synchronizing signal for starting the synchronization control.

When the synchronization control part 28 starts the synchronization control, the switch 44 is switched so that the output signal from the integrator 43 is transmitted to the logic value converter 46 through the switch 44. If the acquisition by the demodulating unit 27 has not been completed at a time when the switch 44 is switched, the trial of acquiring synchronization by the demodulating unit 27 is stopped.

Thus, if the phase determining unit 26 acquires synchronization, the trial of acquiring synchronization by the demodulating unit 27 is stopped. If the phase determining unit 26 has not acquired synchronization, the trial of acquiring synchronization by the demodulating unit 27 continues.

That is, the receiving device 2 tries the acquisition with double configurations. In normal cases, the phase determining unit 26 rapidly acquires synchronization. In a case where the phase determining unit 26 fails to acquire, the demodulating unit 27 subsidiary acquires synchronization. Thus, the receiving device 2 can acquire synchronization with a high degree of certainty.

When the synchronization control part 28 starts the synchronization control, the synchronizing signal is transmitted to the computing elements 32 and 42. The computing element 32 is deactivated by receiving the synchronizing signal, and thereby the phase determining unit 26 is deactivated. Thus, the phase determining unit 26 is deactivated after acquiring synchronization.

When the computing element 42 receives the synchronizing signal, the computing element 42 executes the multiplication at a time corresponding to the synchronizing point. Thereby, the signal from the resistor 24 is despread and demodulated by the demodulation spreading code output from the spreading code generator 41.

The demodulated signal is integrated at the integrator 43 and is transmitted to the logic value converter 46 through the switch 44. The logic value converter 46 converts the integrated signal to a logic value and outputs the logic value as demodulated data.

The demodulated data can be used for controlling an object of a remote keyless entry system. For example, an authentication process is performed for determining whether a code in the demodulated data corresponds to a code stored in a memory of a vehicle. If a predetermined authentication condition is satisfied, a door lock control or an engine start control is performed, for example. The authentication process and various controls are similar to those of a general remote keyless entry system. Thus, a detail description about the authentication process and the various controls is omitted.

An exemplary method of acquiring synchronization by the phase determining unit 26 and the demodulating unit 27 will now be described.

Figure 2:
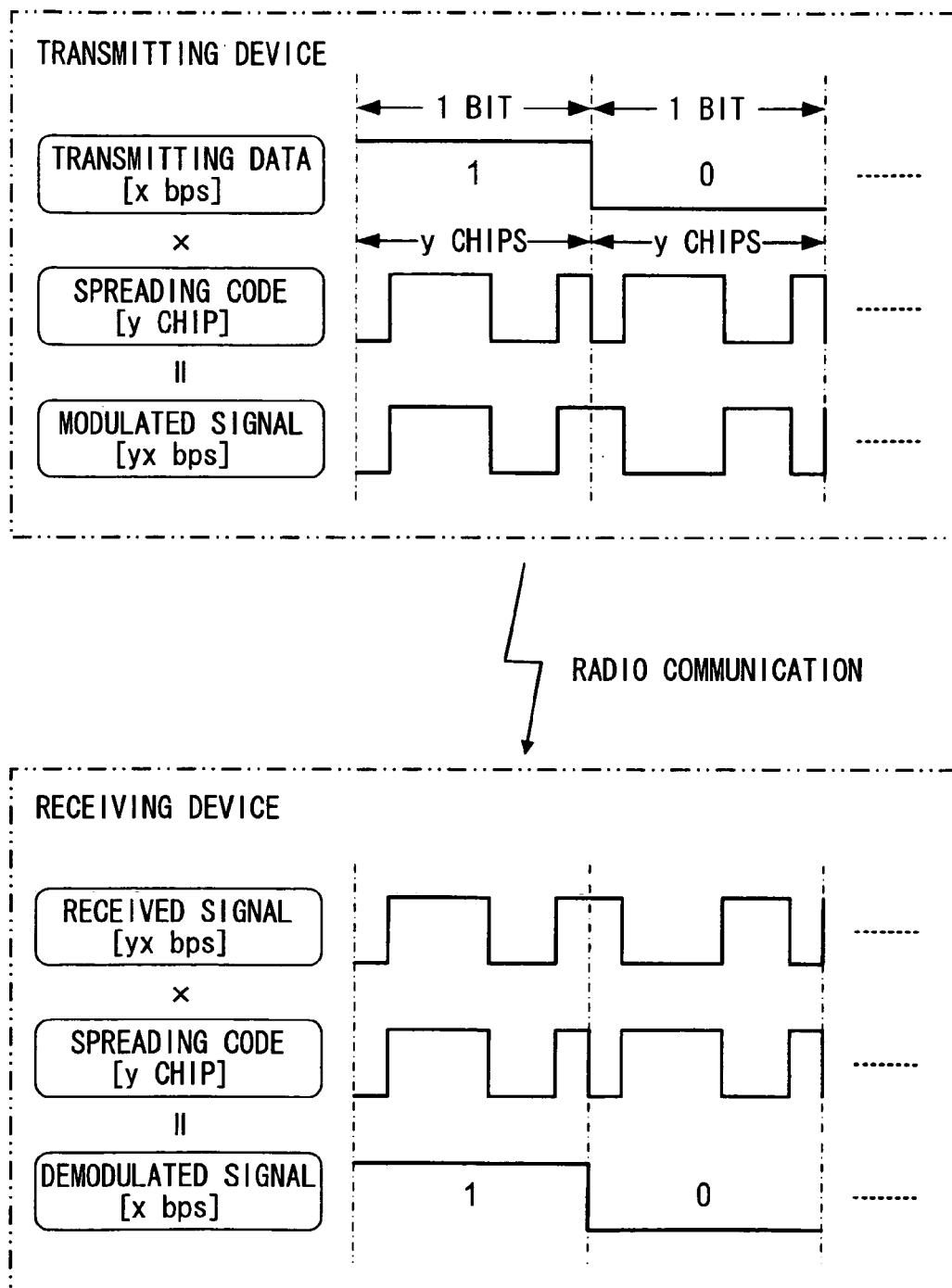
FIG. 2 is a diagram illustrating an exemplary communication method of a spread spectrum communication.

As illustrated in FIG. 2, the transmitting data of the transmitting device 1 is digital data that can be expressed by bits of 1 or 0. Each of the bits is multiplied by the modulation spreading code of y chips. Thereby, the transmitting signal is spread and modulated to y chips.

For example, when a transmission rate of the transmitting data is x bps and each of the bits of the transmitting signal is spread and modulated by the modulation spreading code of y chips, a transmission rate of a modulated signal is yx bps. When the receiving device 2 receives the modulated signal, the receiving device 2 despreads and demodulates the modulated signal by the demodulation spreading code. The demodulation spreading code is same as the modulation spreading code.

In a spread spectrum communication, it is required for acquiring synchronization at a time when a received signal is despread and demodulated. When the receiving device 2 properly acquire synchronization, the receiving device 2 can obtain the demodulated signal same as the transmitting signal by multiplying each of the bits of the received signal by the demodulation spreading code. When the receiving device 2 fails to acquire synchronization, the demodulated signal may be different from the transmitting signal.

Exemplary waveforms of the received signal, the demodulation spreading code, and the demodulated signal are illustrated in FIG. 3 for each case where a phase shifting amount from the synchronizing point is 0, 1, . . . , (y−1) chips. The demodulated signal is created by multiplying the received signal by the demodulation spreading code. The receiving device 2 according to the present embodiment uses an M-sequence code, for example, having 127 chips in each cycle as the demodulation spreading code. However, in a diagram illustrated in FIG. 3, an M-sequence code having 7 chips in each cycle is used as the demodulation spreading code for simplifying the waveforms. Thus, y=7.

When the received signal is synchronized with the demodulation spreading code, that is, when the phase shifting amount is 0 chips, a level of the demodulated signal is 1 for all the chips. The present case corresponds to a case where the received signal is properly despread and demodulated. If a case where the level of each of the chips is 0 is regarded as 1 and a case where the level of each of the chips is 0 is regarded as −1, an autocorrelation value of the demodulated signal for one cycle can be calculated as 1×7=7.

When the received signal is not synchronized with the demodulation spreading code, that is, when the phase shifting amount is other than 0 chip, the level of the demodulated signal is 1 for 3 chips and 0 for 4 chips. Such a case corresponds to a case where the received signal is not properly despread and demodulated. If a case where the level of each of the chips is 0 is regarded as 1 and a case where the level of each of the chips is 0 is regarded as −1, the autocorrelation value of the demodulated signal for one cycle can be calculated as 3×1+4×(−1)=(−1).

Thus, only when the received signal is synchronized with the demodulation spreading code, the autocorrelation value has a peak value. When the received signal is not synchronized with the demodulation spreading code, the autocorrelation value has a low value regardless of the phase shifting amount from the synchronizing point. In the case illustrated in FIG. 3, when the received signal is synchronized with the demodulation spreading code, the autocorrelation value is 7. When the received signal is not synchronized with the demodulation spreading code is −1 regard less of the phase shifting amount from the synchronizing point.

By using the above-described characteristic, a general sliding correlator and a general matched filter find the synchronizing point by monitoring the peak value while shifting the demodulation spreading code of one cycle by one chip. The demodulating unit 27 of the receiving device 2 acquires synchronization by the above-described method, that is, in a manner similar to the general sliding correlator and the general matched filter.

The phase determining unit 26 acquires synchronization in a different manner from the demodulating unit 27. The phase determining unit 26 uses the phase-determining spreading code different from the demodulation spreading code. The phase determining unit 26 calculates a cross-correlation value between the received signal and the phase-determining spreading code. The phase determining unit 26 determines a phase P(0) of the received signal based on the cross-correlation value. The phase P(0) becomes the synchronizing point with the demodulation spreading code.

Figure 4A:
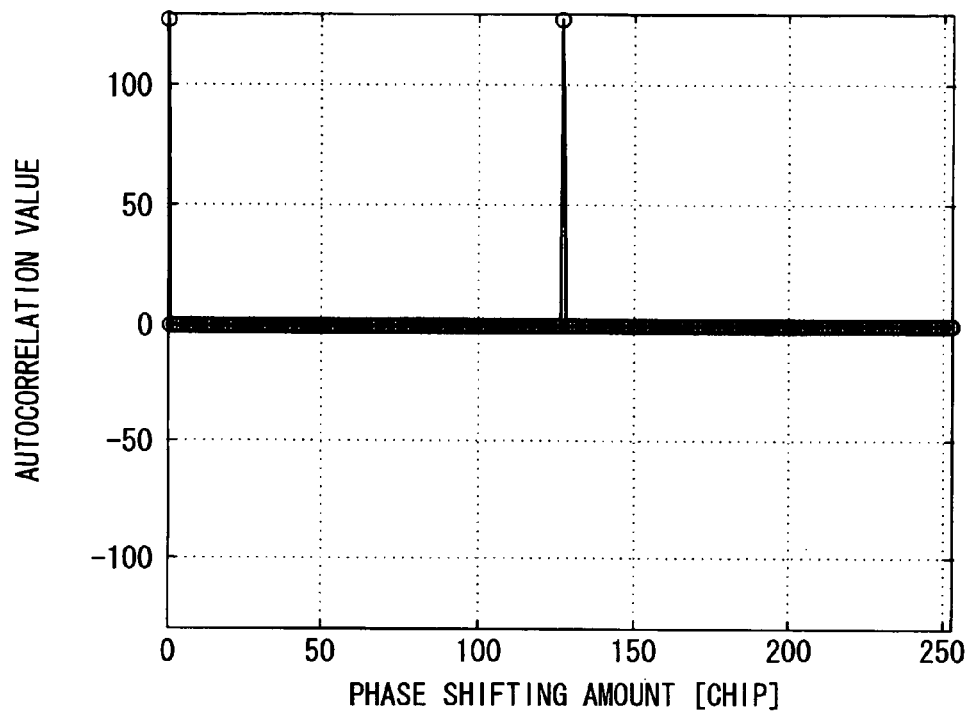
FIG. 4A is a graph illustrating a relationship between a phase shifting amount from a synchronizing point and an autocorrelation value between the received signal and the demodulation spreading code.

As described above, the demodulation spreading code used in the receiving device 2 is the M-sequence code having 127 chips in each cycle. The demodulation spreading code is same as the modulation spreading code. Thus, the autocorrelation value between the received signal and the demodulation spreading code has a peak value at the synchronizing point and has low values at points other than the synchronizing point, as illustrated in FIG. 4A. The relationship between the phase shifting amount and the autocorrelation value illustrated in FIG. 4A is substantially similar to the above-described case illustrated in FIG. 3 where the demodulation spreading code is the M-sequence code having 7 chips.

The phase-determining spreading code is different from the demodulation spreading code and the modulation spreading code. In the present embodiment, the phase-determining spreading code is another M-sequence code having 127 chips in each cycle. In the M-sequence codes having 127 chips in each cycle, there are 18 varieties. One of the 18 varieties is used as the demodulation spreading code and the modulation spreading code. The phase-determining spreading code is selected from the other 17 varieties.

Figure 4B:
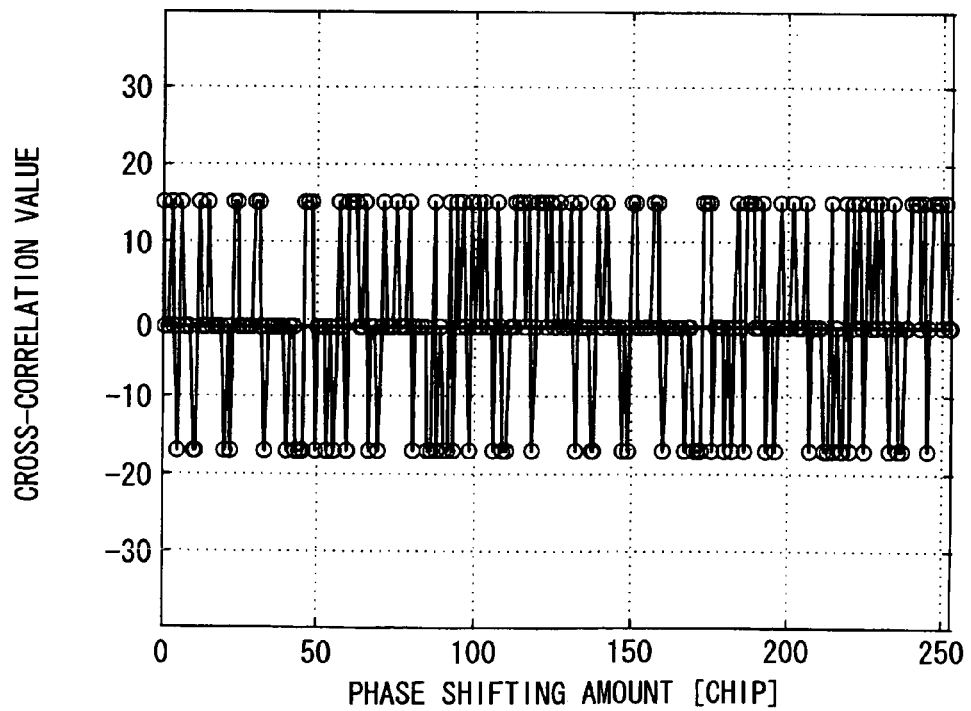
FIG. 4B is a graph illustrating a relationship between the phase shifting amount and a cross-correlation value between the received signal and a phase-determination spreading code.

Thus, the relationship between the phase shifting amount and the cross-correlation value of the received signal and the phase-determining spreading code is different from the relationship between the phase shifting amount and the autocorrelation value. As illustrated in FIG. 4B, the cross-correlation value varies among a plurality of different values, for example, 3 values, in accordance with the phase shifting amount.

The variable number of the cross-correlation values depends on the M-sequence code used as the phase-determining spreading code. When one of the other 17 varieties of the M-sequence code is used as the phase-determining spreading code, the variable number is 3 for 10 varieties, 7 for 6 varieties, and 11 for 1 variety.

The phase-determining spreading code may be any one of the other 17 varieties. In each case, the variable number of the cross-correlation value can be previously confirmed. Thus, after the M-sequence code used as the modulation spreading code and the demodulation spreading code is selected, the M-sequence code used as the phase-determining spreading code can be selected from the other 17 varieties so that the cross-correlation value varies among 3 values as illustrated in FIG. 4B. in such a case, the cross-correlation value corresponding to respective phase shifting amounts 0, 1, . . . , (y−1) chips is one of the 3 values. Thus, even if the cross-correlation value is specified as one of the 3 different values, the phase shifting amount is difficult to be determined based on the cross-correlation value.

In the graph illustrated in FIG. 4B, a part of the graph having a predetermined range can be clipped from different regions.

When the clipped range is narrower than 7 chips, a line of one clipped graph may be same as a line of another clipped graph even when the clipped regions are different from each other. However, when the clipped range is greater than or equal to 7 chips, the lines of the clipped graphs do not overlap each other as long as the clipped regions are different from each other.

A combination of 7 phases $\{P(x_1), P(x_2), \ldots, P(x_7)\}$ corresponding to phase shifting amounts $x_1, x_2, \ldots, x_7$ are selected from the received signals. Then, a product sum of the received signal for 127 chips included in each of the 7 phases $\{P(x_1), P(x_2), \ldots, P(x_7)\}$ and the phase-determining spreading code is calculated so that a combination of the 7 cross-correlation values $\{Q(x_1), Q(x_2), \ldots, Q(x_7)\}$ is obtained. The combination of the 7 cross-correlation values $\{Q(x_1), Q(x_2), \ldots, Q(x_7)\}$ changes with a range of the phase shifting amounts $x_1, x_2, \ldots, x_7$.

In the 3 cross-correlation values illustrated in FIG. 4B, the absolute value of each of the 3 values is not important as long as the 3 values can be discriminated. Thus, the 3 values can be regarded as cross-correlation levels 0, 1, and 2. When the 3 values of the cross-correlation values is converted into the cross-correlation levels, a part of the graph illustrated in FIG. 4B is changed into a graph illustrated in FIG. 5A.

A combination of 7 phases $\{P(0), P(1), \ldots, P(6)\}$ at where the phase shifting amount from the synchronizing point P(0) is 0, 1, . . . , 6 is selected from the received signals illustrated in FIG. 5A. Then, a combination of the cross-correlation values {Q(0), Q(1), ..., Q(6)} of the received signal for 127 chips included in each of the phases {P(0), P(1), ..., P(6)} and the phase-determining spreading code is calculated. As a result, the combination of the cross-correlation values {Q(0), Q(1), ..., Q(6)} becomes {2, 1, 1, 2, 1, 0, 2}.

Next, a combination of 7 phases {P(1), P(2), ..., P(7)} at where the phase shifting amount from the synchronizing point P(0) is 1, 2, ..., 7 is selected from the received signals. Then, the cross-correlation values {Q(1), Q(2), ..., Q(7)} of the received signal for 127 chips included in each of the phases {P(1), P(2), ..., P(7)} and the phase-determining spreading code is calculated. As a result, the combination of the cross-correlation values {Q(1), Q(2), ..., Q(7)} becomes {1, 1, 2, 1, 0, 2, 1}.

Similarly, the cross-correlation values {Q($x_1$), Q($x_2$), ..., Q($x_7$)} at where the phase shifting amount from the synchronizing point P(0) is $x_1, x_2, ..., x_7$ is calculated as illustrated FIG. 5B.

There are 127 combinations in 7 cross-correlation values {Q($x_1$), Q($x_2$), ..., Q($x_7$)}. In the 127 combinations, the 7 cross-correlation values do not arranged in the same order. Thus, in the graph illustrated in FIG. 5A, a line connecting {Q($x_1$), Q($x_2$), ..., Q($x_7$)} does not overlap each other.

Even though the cross-correlation value varies among only the 3 values, there are 127 different combinations in the 7 cross-correlation values {Q($x_1$), Q($X_2$), ..., Q($x_7$)}.

If a correspondence relationship between the 127 combinations of 7 cross-correlation values {Q($x_1$), Q($x_2$), ..., Q($x_7$)} and the 127 phase shifting amounts is previously stored, when one combination of 7 cross-correlation values {Q($x_1$), Q($x_2$), ..., Q($x_7$)} is detected, a phase shifting amount $x_1$ corresponding to the one combination of 7 cross-correlation values {Q($x_1$), Q($x_2$), ..., Q($x_7$)} can be specified.

If the table illustrated in FIG. 5B is previously stored, when the combination of 7 cross-correlation values, for example, {2, 1, 0, 2, 1, 1, 1} is detected, the combination is searched from the table. Thereby, the phase shifting amount corresponding to the combination of 7 cross-correlation values {2, 1, 0, 2, 1, 1, 1} can be specified as 3.

The phase determining unit 26 acquires synchronization in the above-described way. The computing element 32 multiplies the signal output from the resistor 24 by the phase-determining spreading code output from the spreading code generator 21 so as to obtain the cross-correlation values of the signal and the phase-determining spreading code. By calculating the cross-correlation values for 7 phases, the combination of 7 cross-correlation values {Q($x_1$), Q($x_2$), ..., Q($x_7$)} can be obtained.

The storage 33 stores phase-determining information as illustrated in FIG. 5B. Although the storage 33 may store the combination of 7 cross-correlation values {Q($x_1$), Q($x_2$), ..., Q($x_7$)} as the phase determining information, in the receiving device 2 according to the present embodiment, the storage 33 stores feature points corresponding to the combination of 7 cross-correlation values {Q($x_1$), Q($x_2$), ..., Q($x_7$)} as the phase determining information.

Each of the 7 cross-correlation values has one of the 3 cross-correlation levels 0, 1, and 2. Thus, the 7 cross-correlation values can be regarded as 7-digit base 3 numbers as illustrated in FIG. 5B. The 7-digit base 3 numbers can be used as feature points corresponding to 127 phase shifting amounts.

Figure 6:
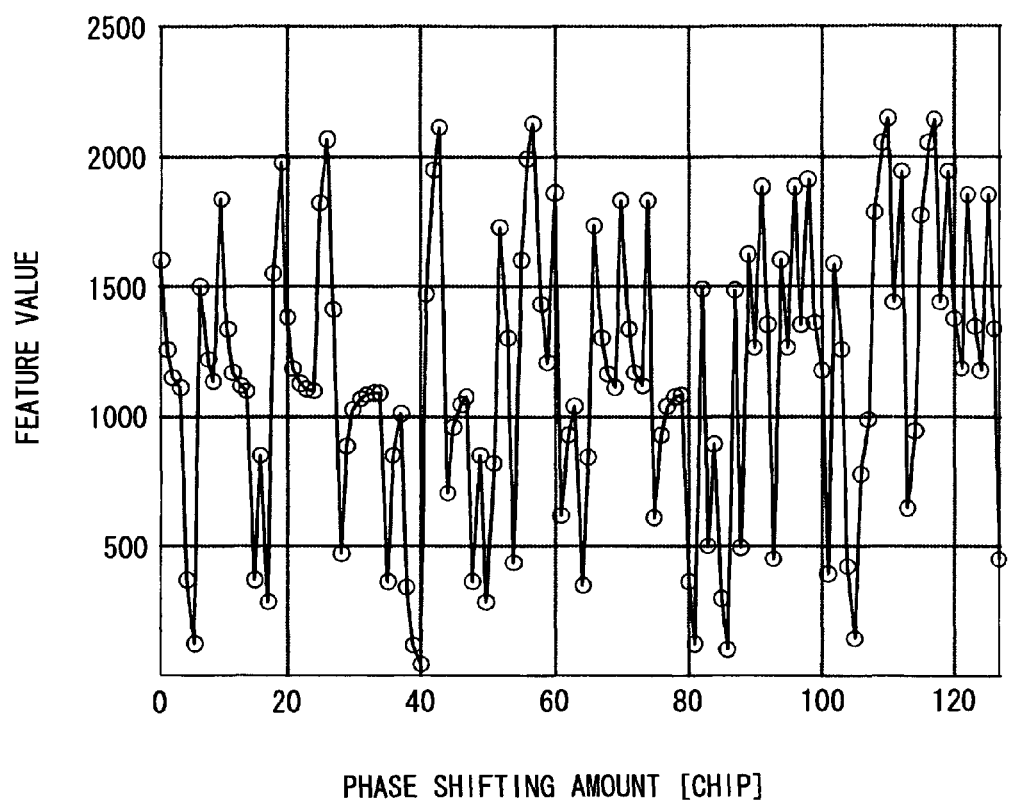
FIG. 6 is a graph illustrating a relationship between the phase shifting amount and a featured value.

The correspondence relationship between the feature points and the phase shifting amounts as illustrated in FIG. 6 is stored in the storage 33 as the phase determining information. When a feature point is detected, the phase shifting amount corresponding to the feature points can be determined based on the phase determining information.

When the determining part 34 acquires the combination of 7 cross-correlation values {Q($x_1$), Q($x_2$), ..., Q($x_7$)}, the determining part 34 calculates the feature point based on the combination of 7 cross-correlation values {Q($x_1$), Q($x_2$), ..., Q($x_7$)}. Then, the determining part 34 determines the phase shifting amount $x_1$ corresponding to the feature point by reference to the phase determining information stored in the storage 33.

Thus, the determining part 34 can specify the phase shifting amount $x_1$ when the determining part 34 acquire the combination of 7 cross-correlation values {Q($x_1$), Q($x_2$), ..., Q($x_7$)}.

In the general sliding correlator and the general matched filter, even if a combination of 7 autocorrelation values {R($x_1$), R($x_2$), ..., R($x_7$)} is acquired, it is difficult to find a peak value at the time in most cases. In order to find the peak value, the general sliding correlator and the general matched filter may need to acquire autocorrelation values greater than 7 up to 127.

In contrast, the phase determining unit 26 can specify the phase shifting amount $x_1$ at the time when the phase determining unit 26 acquires the combination of 7 cross-correlation values {Q($x_1$), Q($x_2$), ..., Q($x_7$)}. Then, the phase determining unit 26 transmits information about the synchronizing point to the synchronization control part 28, and the synchronization control part 28 starts the synchronization control.

When the phase determining unit 26 processes the combination of 7 cross-correlation values {Q($x_1$), Q($x_2$), ..., Q($x_7$)}, the phase determining unit 26 may process sequentially in a manner similar to the sliding correlator. Alternately, the phase determining unit 26 may process in parallel in a manner similar to the matched filter.

In a case where the process is performed sequentially in a manner similar to the sliding correlator, a communication speed x=1 kps, and the spreading code y=127 chips, the demodulating unit 27 and the general sliding correlator take about 128 milliseconds for acquiring 127 autocorrelation values according to the following formula (1).

$$y/(yx) + \left\{\frac{(y+1)/}{(yx)}\right\} \times (y-1) = 127/(127 \times 1k) + \left\{\frac{128/}{(127 \times 1k)}\right\} \times 126 \quad (1)$$

$$\cong 128 \text{ (milliseconds)}$$

On the other hand, the determining part 34 needs only 7 cross-correlation values. The determining part 34 takes about 7.05 milliseconds for acquiring the 7 cross-correlation values according to following formula (2).

$$y/(yx) + \left\{\frac{(y+1)/}{(yx)}\right\} \times 6 = 127/(127 \times 1k) + \left\{\frac{128/}{(127 \times 1k)}\right\} \times 6 \quad (2)$$

$$\cong 7.05 \text{ (milliseconds)}$$

Thus, in the method using the sliding correlator, the determining unit 34 can acquire synchronization more rapidly than the general method.

In a case where the process is performed in parallel in a manner similar to the matched filter, a communication speed x=1 kps and the spreading code y=127 chips, the general matched filter takes about 1.99 milliseconds for acquiring 127 autocorrelation values according to the following formula (3).

$$y/(yx) + (y-1)/(yx) = 127/(127 \times 1k) + 126/(127 \times 1k)\} \quad (3)$$

$$\cong 1.99 \text{ (milliseconds)}$$

On the other hand, the determining part 34 needs only 7 cross-correlation values. The determining part 34 takes about 1.05 milliseconds for acquiring the 7 cross-correlation values according to following formula (4).

$$y/(yx) + 6/(yx) = 127/(127 \times 1k) + 6/(127 \times 1k)\} \quad (4)$$

$$\cong 1.05 \text{ (milliseconds)}$$

Thus, in the method using the matched filter, the determining unit 34 can acquire synchronization more rapidly than the general method.

The processing speed of the matched filter is originally high due to the parallel processing. Thus, the absolute value of the difference between the process speed of the determining unit 34 and the process speed of the general matched filter is less than a case using the sliding correlator. However, the processing speed of the determining unit 34 is about 1.9 times higher than the processing speed of the general matched filter.

As a result, in both of the method using the sliding correlator and the method using the matched filter, the speed of acquiring synchronization can be increased by applying the method used in the determining part 34. Furthermore, also in a synchronization acquisition method in which a part of a sliding correlator processes in parallel so as to have a processing speed between the general matched filter and the general sliding correlator, the speed of acquiring synchronization can be increased by applying the above-described method used in the determining part 34.

In the above-described example, the chip number of the spreading code is 127 chips. When the chip number of the spreading code increases, a time required for acquiring autocorrelation for one cycle using the general method increases. However, the determining part 34 can acquire synchronization using a combination of several cross-correlation values. Thus, the speed of acquiring synchronization can be increased more than a case where the chip number of the spreading code is 127 chips.

For using the above-described synchronization acquisition method, each bit of the transmitting data is required to be configured by only 0 or 1. If signals each including 0 and 1 continue, it is difficult to determine the synchronizing point.

Thus, the transmitting device 1 may be configured so as to transmit signals in which 0 or 1 continues for a predetermined number of bits.

(Second Embodiment)

Figure 7:
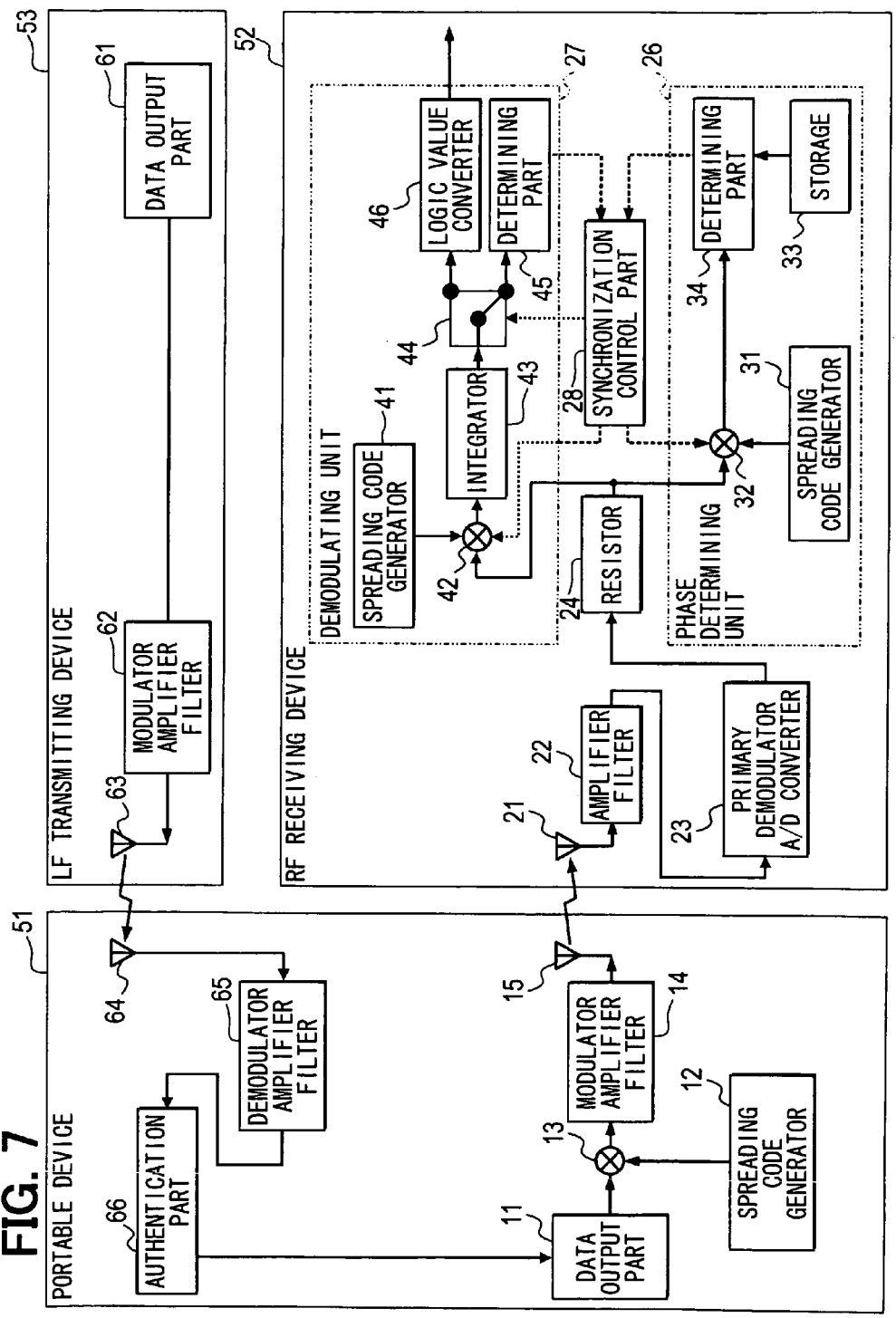
FIG. 7 is a block diagram illustrating a smart entry system including an LF transmitting device, an LF receiving and RF transmitting device, and an RF receiving device according to a second embodiment.

A receiving device according to a second embodiment of the present invention can be used as an RF receiving device 52. As illustrated in FIG. 7, the RF receiving device 52 configurates a smart entry system with an LF transmitting device 53 and a portable device 51. The RF receiving device 52 and the LF transmitting device 53 are provided in a vehicle. The portable device 51 can function as a LF receiving device and a RF transmitting device.

The LF transmitting device 53 transmits a low-frequency (LF) signal to the portable device 51. The portable device 51 transmits a radio-frequency (RF) signal to the RF receiving device 52 by a spread spectrum communication system.

The LF transmitting device 53 includes a data output part 61, a modulator/amplifier/filter 62, and an antenna 63. A transmitting data from the data output part 61 is modulated at the modulator and passes through the amplifier and the filter. Then, the transmitting data is transmitted to the antenna 63.

The portable device 51 has a structure similar to the transmitting device 1 according to the first embodiment. In addition, the portable device 51 includes an antenna 64, a demodulator/amplifier/filter 65, and an authentication part 66. The signal transmitted from the LF transmitting device 53 is received at the antenna 64. The received signal passes through the amplifier and the filter and is demodulated at the demodulator. Then, the demodulated data is transmitted to the authentication part 66.

The authentication part 66 determines whether the received data is data from the corresponding LF transmitting device 53 based on a code in the data. If the authentication part 66 determines that the received data is data from the corresponding LF transmitting device 53, the authentication part 66 outputs a transmitting order to the data output part 11.

When the data output part 11 receives the transmitting order, the data output part 11 functions in a manner similar to the data output part 11 described in the first embodiment. Thus, the portable device 51 transmits data to the RF receiving device 52 by the spread spectrum communication system.

The RF receiving device 52 has a configuration similar to the receiving device 2 according to the first embodiment. The RF receiving device 52 can function in a manner similar to the receiving device 2. The RF receiving device 52 acquires synchronization, despreads and demodulates the received signal, converts the demodulated signal into a logic value, and outputs the logic value as demodulated data. The demodulated data is used for controlling an object by the smart entry system. Except for the above-described synchronization acquisition method, the smart entry system illustrated in FIG. 7 is similar to a general smart entry system. Thus, a detail description of the smart entry system is omitted.

An application of the configuration of the receiving device 2 is not limited to the remote keyless entry system described in the first embodiment and the smart entry system described in the second embodiment. The configuration of the receiving device 2 can be applied to various systems using a spread spectrum communication. Also in such a case, a speed of acquiring synchronization can be increased.

(Third Embodiment)

Figure 8:
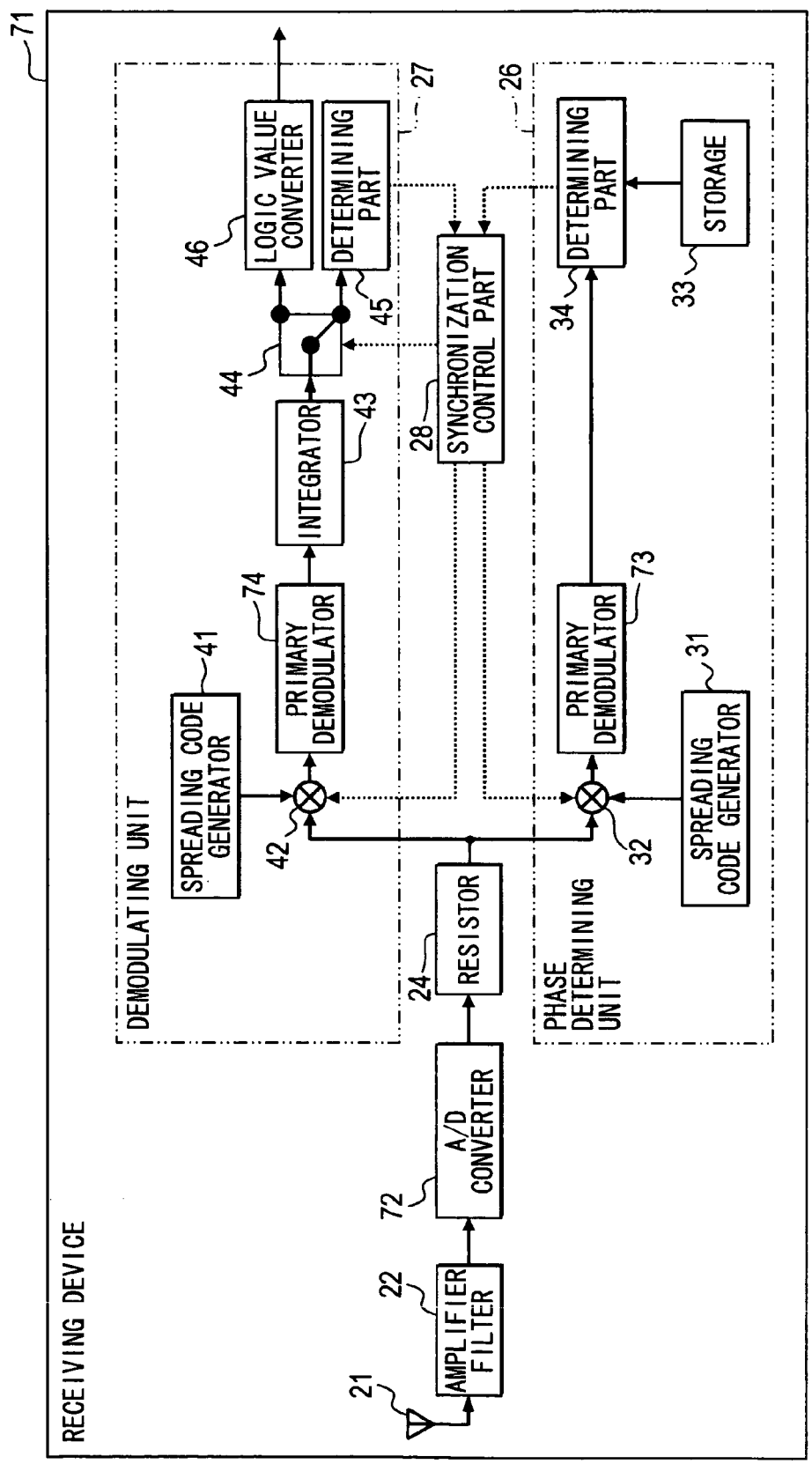
FIG. 8 is a block diagram illustrating a receiving device according to a third embodiment.

A receiving device 71 according to a third embodiment of the present invention will be described with reference to FIG. 8. In the receiving device 2 according to the first embodiment, the primary demodulator/analog-digital converter 23 performs the primary demodulation including an amplitude shift keying (ASK) or a phase shift keying (PSK). Then, the computing element 42 performs the secondary demodulation by the despreading process. An order of the two demodulation processes may be reversed.

The receiving device 71 according to the present embodiment includes an analog-digital converter 72 instead of the primary demodulator/analog-digital converter 23. The analog-digital converter 72 performs only an analog-digital conversion.

The signal converted at the analog-digital converter 72 is despread at the computing element 32 or 42. That is, a process corresponding to the secondary demodulation of the first embodiment is performed before a process corresponding the primary demodulation. Then, the signal output from the computing element 32 or 42 is transmitted to a primary demodulator 73 or 74. The primary demodulator 73 or 74 performs the process corresponding the primary demodulation of the first embodiment.

Also in the present case, the synchronization acquisition method described in the first embodiment can be used, and thereby the speed of acquiring synchronization can be increased.

(Fourth Embodiment)

Figure 9:
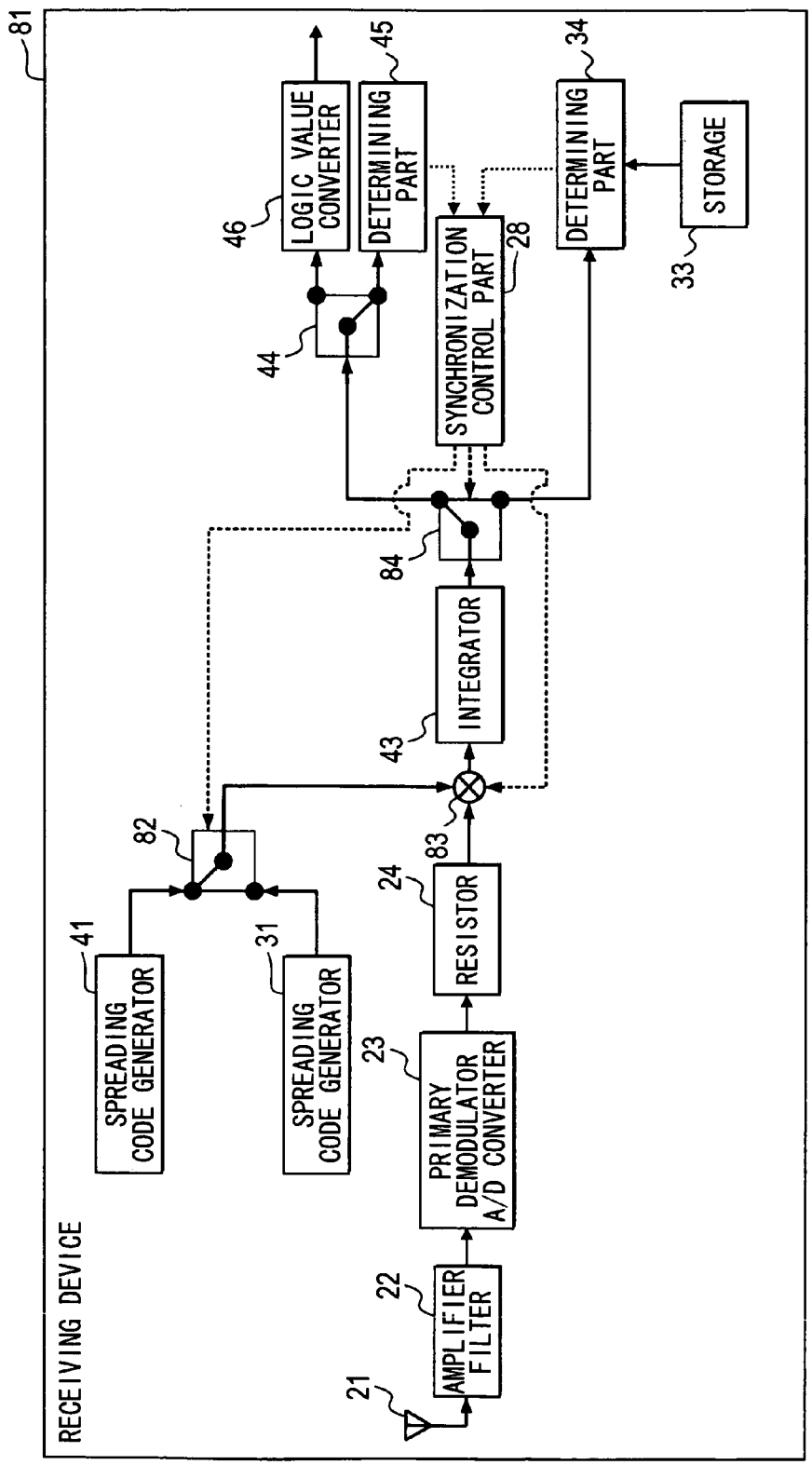
FIG. 9 is a block diagram illustrating a receiving device according to a fourth embodiment.

A receiving device 81 according to a fourth embodiment of the present invention will be described with reference to FIG. 9.

The receiving device 81 includes a switch 82 for switching between the spreading code generator 31 for outputting the phase-determining spreading code and the spreading code generator 41 for outputting the demodulation spreading code.

The receiving device 2 according to the first embodiment includes the two computing elements 32 and 42. However, the receiving device 81 can acquire cross-correlation value and can despread and demodulate the received signal by using one computing element 83.

An output signal from the computing element 83 is integrated at the integrator 43. The integrated signal is distributed to the determining part 34 or the logic value converter 46 by a switch 84.

Before acquiring synchronization, the switch 82 is switched to the spreading code generator 31 for outputting the phase-determining spreading code. The switch 84 is switched to the determining part 34. The computing element 83 acquires the cross-correlation value between the received signal and the phase-determining spreading code. The cross-correlation value is transmitted to the determining part 34 through the switch 84. The determining part 34 can acquire synchronization at a high speed by using the method described in the first embodiment.

When the determining part 34 successfully acquires synchronization, the information is transmitted to the synchronization control part 28. The synchronization control part 28 switches the switch 82 and the switch 84. The switch 82 is switched to the spreading code generator 41 for outputting the demodulation spreading code. Thus, the computing element 83 despreads and demodulates the received signal with the demodulation spreading code. The demodulated signal is transmitted to the logic value converter 46 through the switch 84.

In such a way, the two computing elements 32 and 42 in the receiving device 2 illustrated in FIG. 1 can be replaced by the one computing element 83. Thereby, the number of logic gates can be reduced by the number of computing elements.

(Other Embodiments)

Although the present invention has been fully described in connection with the preferred embodiments thereof with reference to the accompanying drawings, it is to be noted that various changes and modifications will become apparent to those skilled in the art.

In the receiving device 2 illustrated in FIG. 1, the phase determining unit 26 and the demodulating unit 27 concurrently execute the processes for acquiring synchronization. Alternatively, a receiving device may be configured so that a component corresponding to the phase-determining unit acquires synchronization and a component corresponding to the demodulating unit does not acquire synchronization. In such a case, the synchronization acquisition does not performed with double configurations. However, a configuration of the receiving device can be simplified, and thereby a cost of the receiving device can be reduced.

In the smart entry system illustrated in FIG. 7, the portable device 51 and in-vehicle device including the LF transmitting device 53 and the RF receiving device 52 communicate in two-way, and the configuration of the receiving device according to the second embodiment is applied to the in-vehicle device, that is, the RF receiving device 52. In a case where two-way communication is performed between two devices, the configuration of the receiving devices according to the above-described embodiments can be applied to at least one of the two devices. For example, both of the two devices may have the configuration of the receiving devices according to the above-described embodiments.

A known art in the spread spectrum communication can be applied to the receiving devices according to the above-described embodiments. For example, a signal of one chip may be divided into predetermined sampling number N. In a case where the number of samplings is N samplings per chip, there is a possibility that it takes about N times longer than a case where the signal is not divided depending on a method of acquiring synchronization. However, by using the method in the above-described embodiments, a time required for acquiring synchronization can be reduced.

In the above-described embodiments, the phase-determining spreading code is set so that the variable number of the cross-correlation values is 3, as an example. The variable number of the cross-correlation values can be any number. For example, in the M-sequence code with 127 chips, there is a code providing 7 different values of the cross-correlation value and the code may be used as the phase-determining spreading code.

In the above-described embodiments, the cross-correlation values are variable among 3 values. Thus, the phase shifting amount is determined based on the combination of the cross-correlation values at 7 different phases. When the cross-correlation values are variable among a plurality of values greater than 3, a combination specifying the corresponding phase shifting amount can possibly be obtained by calculating cross-correlation value at different phases less than 7.

When the variable number of the cross-correlation values is increased, if the cross-correlation value fluctuates due to an external cause such as noise, a misidentification of the cross-correlation value can possibly occur. Thus, it is required to take the following point into consideration.

In view of a resistance to noise, it is prefer to reduce the variable number of the cross-correlation values. However, when the variable number of the cross-correlation values increases, the number of cross-correlation values for specifying the phase shifting amount can be reduced. Therefore, the phase-determining spreading code is selected taking into consideration the balance between the resistance to noise and the number of cross-correlation values and an envisioned noise level.

In the above-described embodiments, when the cross-correlation values are variable among 3 values, the specific combination corresponding to the phase shifting amount can be provided by the cross-correlation values at 7 different phases. In order to increase reliability, a combination of the cross-correlation values at different phases greater than 7 can be used.

In the above-described embodiments, the combination of 7 phases is selected in such a manner that the 7 phases are equally shifted by one chip. The combination of 7 phases may also be selected in such a manner that the 7 phases are equally shifted by two chips or three chips. Alternatively, the combination of 7 phases may be selected in such a manner that the 7 phases are shifted unequally by a predetermined number of chips. For example, a second phase may be shifted from a first phase by one chip and a third phase may be shifted from the second phase by two chip. Regardless of even or uneven, it is required to specify combination of the cross-correlation values. Thus, phase shifting differences among the 7 phases are predetermined.

What is claimed is:

1. A receiving device for spread spectrum communication and for receiving a signal spread and modulated with a first spreading code, the receiving device comprising:

a phase determining unit calculating a cross correlation between the received signal and a second spreading code and determining a phase P(0) of the received signal based on the cross correlation, the phase P(0) being a synchronizing point with the first spreading code; and a data demodulating unit synchronizing the phase P(0) and the first spreading code and despreading and demodulating the received signal with the first spreading code, wherein:

the number of components in each of the first spreading code and the second spreading code is defined as Y;

Y is an integer greater than or equal to 2;

the phase determining unit includes a cross-correlation calculating element;

the cross correlation calculating element selects a combination of N phases from the received signal;

the combination of N phases is defined as $\{P(x_1), P(x_2), \ldots, P(x_N)\}$;

$x_1, x_2, \ldots, x_N$ represent phase shifting amounts from the phase P(0) and each of the phase shifting amounts is not specified before the phase P(0) is determined;

a phase shifting difference between two of the phase shifting amounts is a predetermined number of chips;

the cross-correlation calculating element calculates a product sum of the received signal for Y chips included in each of the N phases $\{P(x_1), P(x_2), \ldots, P(x_N)\}$ and the second spreading code so that a combination of N cross-correlation values defined as $\{Q(x_1), Q(x_2), \ldots, Q(x_N)\}$ corresponding to the combination of N phases $\{P(x_1), P(x_2), \ldots, P(x_N)\}$ is obtained;

the combination of N cross-correlation values $\{Q(x_1), Q(x_2), \ldots, Q(x_N)\}$ provides a specific combination corresponding to the phase shifting amount $x_1$;

the cross-correlation calculating element specifies the phase shifting amount $x_1$ based on the combination of N cross-correlation values $\{Q(x_1), Q(x_2), \ldots, Q(x_N)\}$;

the cross-correlation calculating element determines the phase P(0) as a phase shifted by the phase shifting amount $x_1$ from the phase $P(x_1)$; and N represents a predetermined integer that is less than Y and that is set so that the phase shifting amount $x_1$ is specified as one of $0, 1, \ldots, (Y-1)$ when a changing pattern of the combination of N cross-correlation values $\{Q(x_1), Q(x_2), \ldots, Q(x_N)\}$ is determined.

2. The receiving device according to claim 1, wherein:

the phase determining unit further includes a storage;

a relationship between the phase shifting amount $x_1$ and the corresponding combination of N cross-correlation values $\{Q(x_1), Q(x_2), \ldots, Q(x_N)\}$ is previously calculated for each of Y cases where the phase shifting amount $x_1$ is $0, 1, \ldots, (Y-1)$;

the storage stores the relationship as phase determining information;

when the cross-correlation calculating element calculates one combination of N cross-correlation values $\{Q(x_1), Q(x_2), \ldots, Q(x_N)\}$, the cross-correlation calculating element specifies phase shifting amount $x_1$ corresponding to the one combination of N cross-correlation values $\{Q(x_1), Q(x_2), \ldots, Q(x_N)\}$ by reference to the phase determining information stored in the storage; and the cross-correlation calculating element determines the phase P(0) as a phase shifted by the phase shifting amount $x_1$ from the phase $P(x_1)$.

3. The receiving device according to claim 1, wherein:

each of the phase shifting amounts $x_1, x_2, \ldots, x_N$ is an integer satisfying an equation of $x_M = x_1 + M - 1$; and M is one of $2, \ldots, N$.

4. The receiving device according to claim 1, wherein the second spreading code is set so that each of the N cross-correlation values $\{Q(x_1), Q(x_2), \ldots, Q(X_N)\}$ becomes one of three predetermined values.

5. The receiving device according to claim 1, wherein:

the data demodulating unit executes a process for determining the phase P(0) of the received signal based on an autocorrelation between the received signal and the first spreading code concurrently when the phase determining unit executes a process for determining the phase P(0) based on the cross correlation; and when one of the phase determining unit and the data demodulating unit determines the phase P(0), then the data demodulating unit synchronizes the determined phase P(0) and the first spreading code and despreads and demodulates the received signal with the first spreading code.

* * * * *